S. W. THOMPSON.
Cotton Planter.
No. 96,054.                                             Patented Oct. 19, 1869.
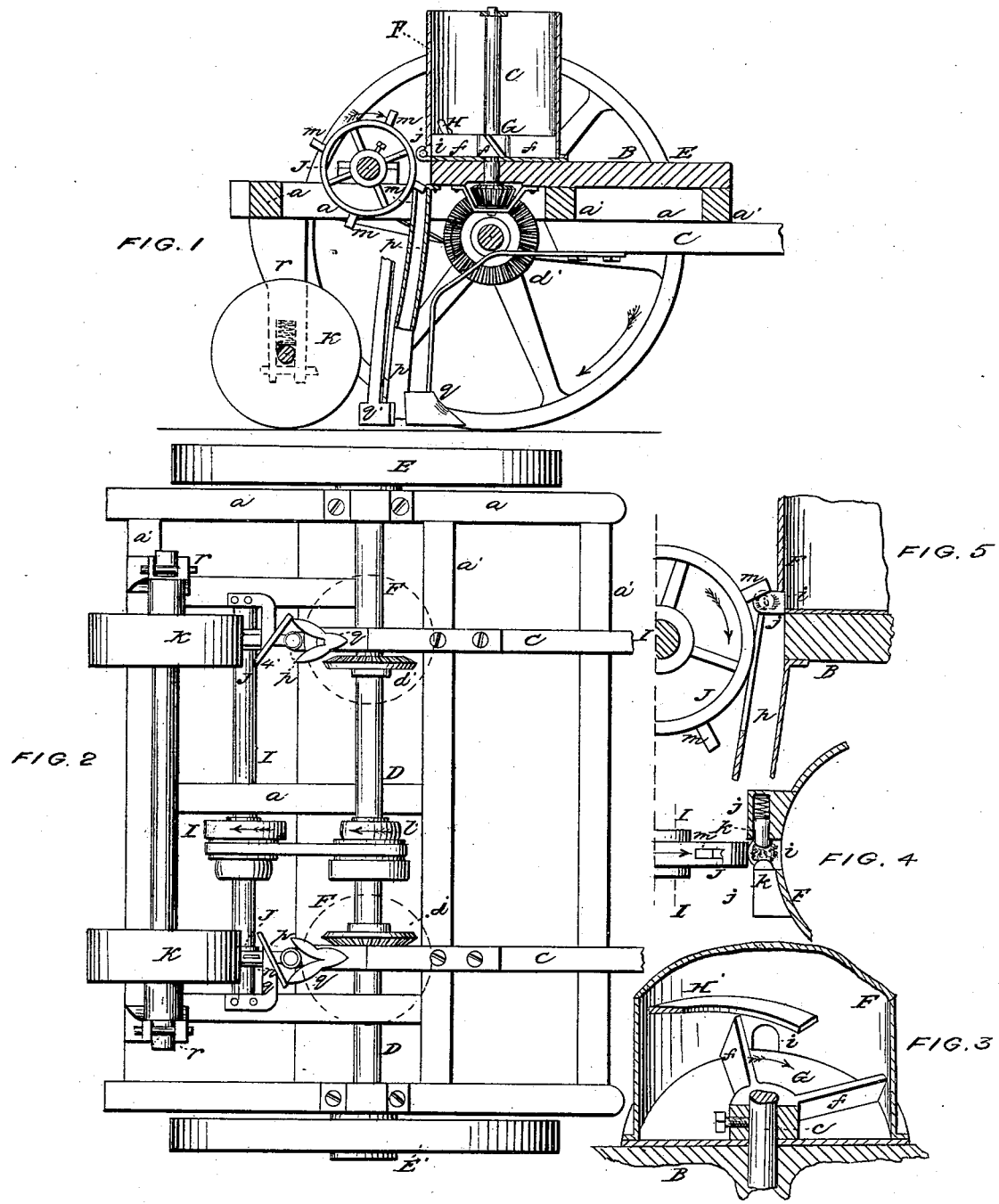

United States Patent Office.

STACY W. THOMPSON, OF OTSEGO, OHIO, ASSIGNOR TO HIMSELF, WILLIAM L. WARD, AND WILLIAM D. WHITECAR, OF PHILADELPHIA, PENNSYLVANIA.

Letters Patent No. 96,054, dated October 19, 1869; antedated October 16, 1869.

IMPROVEMENT IN COTTON-SEED SEPARATOR AND PLANTER.

The Schedule referred to in these Letters Patent and making part of the same.

*To all whom it may concern:*

Be it known that I, STACY W. THOMPSON, of Otsego, county of Muskingum, State of Ohio, have invented an Improved Cotton-Seed Separator and Planter; and I do hereby declare the following to be a full, clear, and exact description of the same.

My invention consists of certain improvements, fully described hereafter, in cotton-seed separators and planters, the improvements being such that the seeds can be separated one at a time from a tangled mass contained in a hopper, and be planted regularly at any required distances apart from each other.

In order to enable others to make and use my invention, I will now proceed to describe its construction and operation, reference being had to the accompanying drawing, which forms a part of this specification, and in which—

Figure 1 is a vertical section of my improved cotton-seed separator and planter;

Figure 2, an inverted plan view of the same; and

Figures 3, 4, and 5, detached sectional views, drawn to an enlarged scale, and illustrating portions of my invention.

Similar letters refer to similar parts throughout the several views.

The frame of the machine consists of longitudinal and transverse beams $a$ and $a'$, upon which the platform B is mounted, and to the under side of which the shafts C C are secured.

This frame is supported upon an axle, D, having at its outer ends the wheels E and E', by which the machine is drawn over the ground.

F F are two cylindrical hoppers, open at the top, and secured upon the platform B, at points directly above the axle D, each of the said hoppers being provided with a vertical spindle, $c$, which has, at its lower end, a bevel-wheel, $d$, gearing into a larger wheel, $d'$, of the axle.

Upon each spindle $c$, close to the bottom of the hopper, is an agitator or stirrer, G, having inclined arms $f$; and a metal strip or guide, H, is secured to the side of the hopper, and is so bent or curved downward at its rear end, that it shall be almost in contact with the arms of the said agitator, as best observed in fig. 3, for a purpose described hereafter.

An opening, $i$, is formed in the hopper, directly beneath this guide H; and in projections $jj$ of the hopper, at each side of the said opening, are arranged, to slide, two spring-catches $k\ k$, the outer ends of which are rounded, as seen in fig. 4.

A shaft, I, is arranged to turn in suitable bearings in the frame of the machine, at the rear of the hoppers F F, and is provided with a cone-pulley, $l$, connected by a suitable belt, with a similar pulley, $l'$, on the axle D.

This shaft has two wheels, J J, one directly behind each of the hoppers, and on the rim of each wheel is a number of pins, $m$, which are arranged to strike and pass between the spring-catches $k\ k$. (See figs. 4 and 5.)

Beneath each pair of spring-catches is attached a tube, $p$, by means of which the seeds are conveyed from the hopper to the ground, and in front of this tube is arranged a plow, $q$, and directly behind it a hoe-like scraper, $q'$, while at the rear of the latter there is a roller, K, whose spindle turns in spring-bearings of hangers $r\ r$, which are secured to the frame of the machine.

The difficulty experienced in planting cotton-seeds arises from the fact that they become tangled and matted together, owing to the fibres adhering to them, so that it is necessary to disengage each seed separately from the mass, as it is required.

By the aid of my improved machine, however, the operation of which I will now proceed to describe, I am enabled not only to separate the seeds from the tangled mass, but to plant them regularly at any required distances apart from each other.

Each of the hoppers F having been filled with cotton-seed, the machine is driven forward over the ground, motion being communicated from the axle D to the spindles $c\ c$ and I, causing the several parts to turn in the direction of their respective arrows.

The mass of seed within each of the hoppers is thoroughly stirred, and partially disentangled by means of the agitator G, the seeds, as they are separated and moved by the latter, being directed downward by the guide H, toward the opening $i$, and passed through the same, one at a time; after which they are seized between the spring-catches $k\ k$, and held by the same for an instant by means of their adhering fibres. (See figs. 3 and 4.)

The pins $m$, of the wheels J J, strike and disengage the seeds thus held by the spring-catches, permitting them to fall through the seed-tubes $p$ into the furrows formed by the plows $q$, the earth being spread over the said seeds by the hoes $q'$, and packed tightly upon them by means of the rollers K.

The seeds, being forced between the spring-catches $k\ k$ as quickly as they are disengaged from the same by the pins $m$, will be planted at regular distances apart, and this distance may be varied as required, by increasing or decreasing the number of pins upon the wheels J J, or by altering the speed of the said wheels by shifting the belt upon the cone-pulleys $l$ and $l'$.

Suitable devices should be arranged for throwing the spindles $c\ c$ out of gear with the axle, when the machine is to be turned, or when moving over a road or field where the seeds are not to be planted.

I claim as my invention, and desire to secure by Letters Patent—

1. The combination, with the hopper F, having an opening, $i$, of an agitator, G, and curved guide H, arranged within the said hopper, and operating substantially as and for the purpose set forth.

2. The spring-catches $k$ $k$, arranged, with respect to each other and to the opening $i$ of the hopper, substantially as and for the purpose described.

3. The combination of the spring-catches $k$ $k$ with the pins $m$, of a revolving wheel, J, all as herein set forth for the purpose specified.

In testimony whereof, I have signed my name to this specification, in the presence of two subscribing witnesses.

S. W. THOMPSON.

Witnesses:
 JOHN WHITE,
 HARRY SMITH.